United States Patent
Cai et al.

(10) Patent No.: US 9,634,803 B1
(45) Date of Patent: Apr. 25, 2017

(54) OPTICAL SUBCARRIER MULTIPLEX SYSTEM WITH JOINT FORWARD ERROR CORRECTION CODING

(71) Applicant: Tyco Electronics Subsea Communications LLC, Eatontown, NJ (US)

(72) Inventors: Jin-Xing Cai, Morganville, NJ (US); Matthew V. Mazurczyk, Middletown, NJ (US); Hussam G. Batshon, Neptune, NJ (US); Dmitri Foursa, Colts Neck, NJ (US); Alexei N. Pilipetskii, Colts Neck, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/044,458

(22) Filed: Feb. 16, 2016

(51) Int. Cl.
*H04B 10/04* (2006.01)
*H04L 1/00* (2006.01)
*H04J 14/02* (2006.01)
*H04B 10/54* (2013.01)
*G06F 17/30* (2006.01)

(52) U.S. Cl.
CPC ...... *H04L 1/0071* (2013.01); *G06F 17/30371* (2013.01); *H04B 10/541* (2013.01); *H04J 14/0298* (2013.01)

(58) Field of Classification Search
CPC ... H04B 10/504; H04B 10/541; H04L 1/0071; G06F 17/30371; H04J 14/0298
See application file for complete search history.

(56) References Cited

U.S. PATENT DOCUMENTS

| | | | | |
|---|---|---|---|---|
| 7,778,546 B2 * | 8/2010 | Sucharczuk | | H04H 20/76 398/72 |
| 8,295,713 B2 | 10/2012 | Cai | | |
| 8,634,723 B2 * | 1/2014 | Meiman | | H04B 10/2572 359/483.01 |
| 8,676,056 B2 | 3/2014 | Gottwald | | |
| 8,775,892 B2 * | 7/2014 | Zhang | | H03M 13/29 714/755 |
| 8,849,125 B2 * | 9/2014 | Sun | | H04J 14/06 398/140 |
| 9,236,952 B2 * | 1/2016 | Sun | | H04B 10/6165 |
| 2016/0080102 A1 * | 3/2016 | Fang | | H04J 14/005 398/74 |
| 2016/0127166 A1 * | 5/2016 | Zhang | | H04L 27/367 398/185 |

OTHER PUBLICATIONS

Hui et al; "Subcarrier Multiplexing for High-Speed Optical Transmission"; Journal of Lightwave Technology, vol. 20, No. 3, Mar. 2002; pp. 417-427.
Shieh et al; "Ultrahigh-Speed Signal Transmission Over Nonlinear and Dispersive Fiber Optic Channel: The Multicarrier Advantage"; IEEE Photonics Journal, an IEEE Photonics Society Publication; vol. 2, No. 3, Jun. 2010, pp. 276-283.

(Continued)

*Primary Examiner* — M. R. Sedighian

(57) ABSTRACT

An optical subcarrier multiplex system. An input data signal is jointly coded with at least one forward error correction (FEC) code before symbol mapping and before subcarrier modulation. Joint FEC coding mitigates non-uniform subcarrier performance.

14 Claims, 6 Drawing Sheets

(56) References Cited

OTHER PUBLICATIONS

Du et al; "Optimizing the Subcarrier Granularity of Coherent Optical Communications Systems";Optics Express; vol. 19; No. 9; Apr. 25, 2011; pp. 8079-8084.
Qiu et al; "Subcarrier Multiplexing Using DACs for Fiber Nonlinearity Mitigation in Coherent Optical Communication Systems";OFC 2014; OSA 2014; total of three pages.
Zhang; "Advanced and Low-Complexity Digital Backpropagation for Subcarrier-Multiplexing Systems"; OFC 2015; OSA 2015; total of three pages.
Temprana et al; "Overcoming Kerr-Induced Capacity Limit in Optical Fiber Transmission"; sciencemag.org; vol. 348, Issue 6242; Jun. 26, 2015; pp. 1445-1448.
Nespola et al; "Experimental Demonstration of Fiber Nonlinearity Mitigation in a WDM Multi-Subcarrier Coherent Optical System"; ECOC 2015—ID 0382; total of three pages.
Nakashima et al; "Experimental Investigation on Nonlinear Tolerance of Subcarrier Multiplexed Signals With Spectrum Optimization"; ECOC 2015—ID 0391; total of three pages.
Poggiolini et al; "Analytical Results on System Maximum Reach Increase Through Symbol Rate Optimization"; OFC 2015; OSA 2015; total of three pages.
Poggiolini et al; "On the Ultimate Potential of Symbol-Rate Optimization for Increasing System Maximum Reach"; ECOC 2015—ID 0483; total of three pages.
Carbo et al; "Experimental Analysis of Non Linear Tolerance Dependency of Multicarrier Modulations versus Number of WDM Channels"; OFC 2016; OSA 2016; total of three pages.
Zhang et al; "Cycle Slip Mitigation in Polmux-QPSK Modulation"; OSA/OFC/NFOEC 2011; total of three pages.
Mazurczyk et al; 30 Tb/s Transmission Over 6,630 km Using 16QAM Signals at 6.1 bits/s/Hz Spectral Efficiency; ECOC Postdeadline Papers; 2012 OSA; total of three pages.
Cai et al; "49.3 Tb/s Transmission Over 9100 km Using C+L EDFA and 54 Tb/s Transmission Over 9150 km Using Hybrid-Raman EDFA"; Journal of Lightwave Technology; vol. 33, No. 13, Jul. 1, 2015; pp. 2724-2734.
Abbess et al; "Capacity Improvement Using Dual-Carrier FEC Gain Sharing in Submarine Optical Communications"; OFC 2016; OSA 2016; total of three pages.

* cited by examiner

OPTICAL SUBCARRIER MULTIPLEX SYSTEM WITH JOINT FORWARD ERROR CORRECTION CODING

TECHNICAL FIELD

The present application relates to the optical transmission of information and, more particularly, to an optical subcarrier multiplex system with joint forward error correction coding.

BACKGROUND

In wavelength division multiplexing (WDM) optical communication systems a single optical fiber may be used to carry multiple optical signals. In a single-carrier-based WDM system, each optical signal is generated by directly modulating a high symbol rate (e.g. 32 GBd) baseband data stream on an associated optical channel. Each optical channel may be at an associated wavelength that is separated from adjacent channels by a defined channel-spacing, e.g. according to a channel plan established by the International Telecommunications Union. The optical channels are then multiplexed to form an aggregate or WDM signal.

Single-carrier-based WDM systems have dominated commercial system implementations for long-haul, e.g. trans-oceanic, optical transmission. In an effort to improve transmission performance, subcarrier multiplex (SCM) systems have been investigated. In a SCM system a high symbol rate baseband data stream may be broken down into multiple low symbol rate (e.g. several GBd) baseband data streams. The low symbol rate baseband data streams may each be modulated by a different electrical subcarrier frequency and then multiplexed to form a high symbol rate subcarrier aggregate signal. The subcarrier aggregate signal is modulated by an optical carrier and transmitted as an optical signal. As illustrated for example in FIG. 1, in the transmitted optical signal each of the lower symbol rate baseband data streams occupies a different portion p1, p2 . . . p10 of the optical spectrum surrounding the center wavelength $\lambda_0$ of the optical carrier. SCM systems may be implemented using WDM by modulating multiple different subcarrier aggregate signals on different associated optical channels and multiplexing the optical channels for transmission on an optical transmission path.

Transmitted optical signals propagate on the optical transmission path to a receiver. The receiver detects and demodulates the data. Unfortunately, one problem associated with any optical communication system is maintaining the integrity of the data being communicated, particularly when optical signals are transmitted over long distances in long-haul communication systems. Accumulated contributions of several different linear and/or non-linear impairments associated with the transmission path may cause degradation of the signals and may cause difficulty in differentiating between the binary digits (i.e., the ones and zeros) in a data stream at the receiver.

BRIEF DESCRIPTION OF THE DRAWINGS

These and other features and advantages will be better understood by reading the following detailed description, taken together with the drawings wherein.

DETAILED DESCRIPTION

In general, it has been found that the subcarrier portions of a subcarrier multiplex signal are impacted differently by the transmission path. As a result, transmission performance of the subcarrier portions is not uniform. As system and method consistent with the present disclosure mitigates this non-uniform performance by providing the subcarrier multiplexed signal with joint forward error correction (FEC) coding prior to mapping the data to symbols associated with a chosen optical modulation format and prior to modulating the subcarrier portions with associated electrical subcarrier frequencies.

Figure 1:
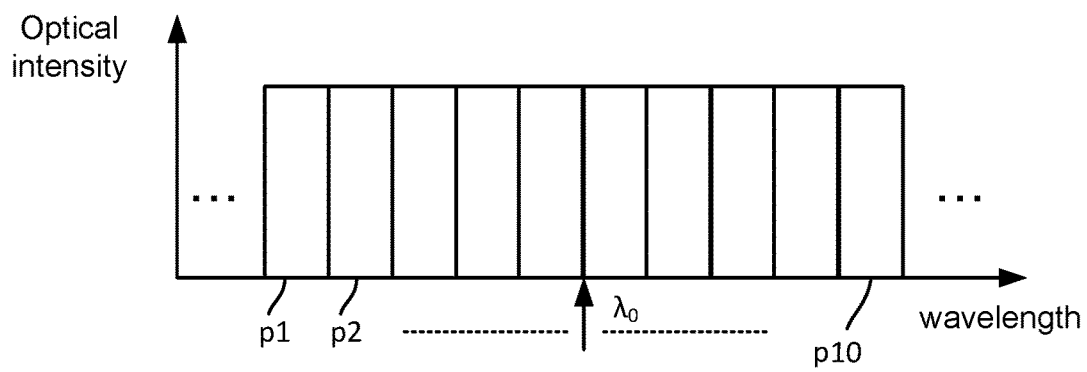
FIG. 1 diagrammatically illustrates a conventional subcarrier multiplexed signal.
Figure 2:
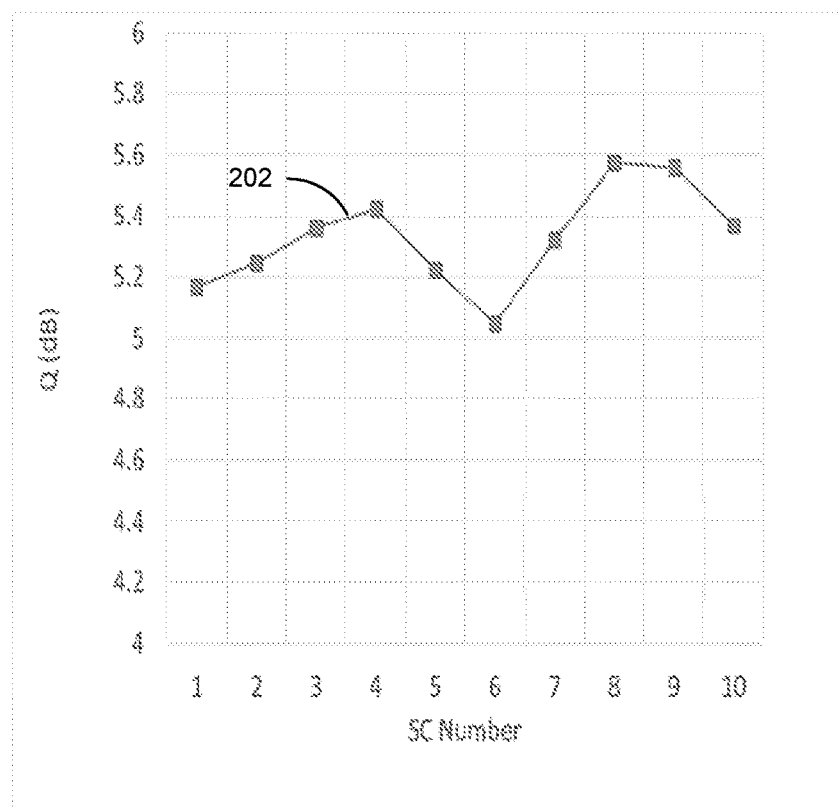
FIG. 2 includes a plot of Q-factor versus subcarrier index number illustrating transmission performance of a prior art SCM system.

Turning to FIG. 2, for example, there is provided a plot 202 of Q-factor versus subcarrier index number illustrating transmission performance of a prior art SCM system including ten subcarriers wherein the subcarrier aggregate signal is modulated using quadrature phase shift keying (QPSK) and transmitted over a distance of 8600 km. References to a number of subcarriers for a particular SCM system described herein refers to the number of low data rate baseband data streams that are modulated by a different electrical subcarrier frequency in the SCM system. Each of the subcarriers may be described by a subcarrier number or subcarrier index. As used herein, the subcarrier number "1" refers to the subcarrier with the lowest electrical subcarrier frequency, subcarrier "2" refers to the subcarrier with the second lowest subcarrier frequency, and so-on.

As illustrated in FIG. 2, transmission performance drops off at the edge and middle subcarriers, e.g. toward the first and tenth subcarriers and the sixth subcarrier, respectively. The plot in FIG. 2 thus generally forms the shape of the letter "m." It has been found that the depth of this m-shape increases with the number of subcarriers and gradually reduces with increased transmission distance. This variation in performance between the subcarriers, which also changes with the number of subcarriers and transmission distance, can create difficulty in achieving a desired transmission performance for an SCM system.

Advantageously, a system and method consistent with the present disclosure mitigates the effects of the variation in performance between subcarriers in an SCM system using joint FEC coding of the data prior to mapping the data to symbols associated with a chosen optical modulation format and prior to modulating the subcarrier portions with associated electrical subcarrier frequencies. As used herein "FEC" coding refers to a scheme whereby one or more bits (the overhead associated with the code) are added to a data stream to assist in detection or correction of data errors. As used herein a "map" or "mapping" refers to a known scheme whereby a code is assigned to each of a contiguous set of bits and does not involve adding additional bits to a data stream (i.e. mapping has no overhead). The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 3:
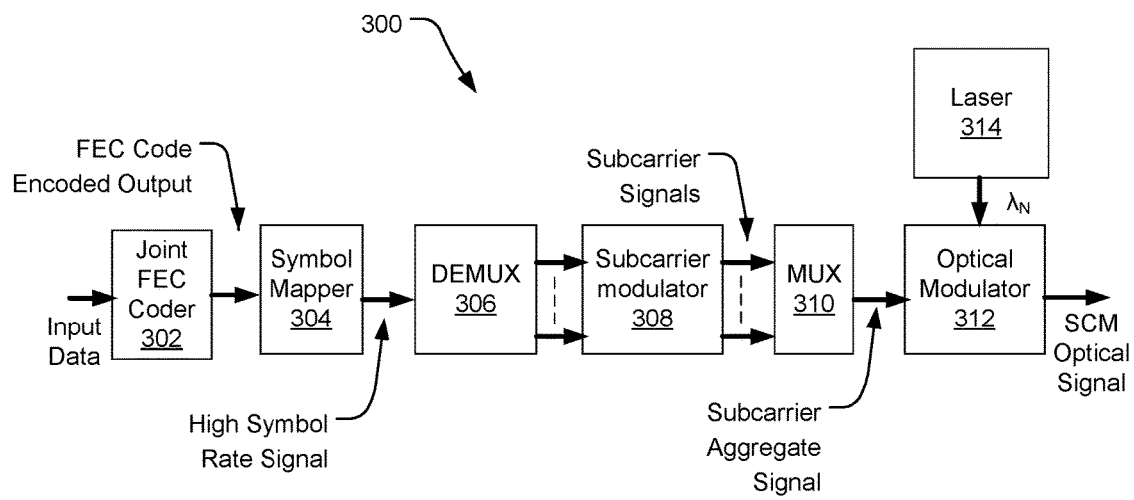
FIG. 3 is a block diagram of one exemplary embodiment of a transmitter consistent with the present disclosure.

FIG. 3 is a simplified block diagram of one exemplary transmitter 300 consistent with the present disclosure. The illustrated exemplary embodiment 300 includes a joint FEC coder 302, a symbol mapper 304, a demultiplexer 306, a subcarrier modulator 308, a multiplexer 310 and an optical modulator 312 for modulating the output of a laser 314, e.g. a continuous wave laser, for providing a modulated output on a carrier wavelength $\lambda_N$.

As shown, bits of a serial high data rate baseband input data stream, or bits of a plurality of parallel low data rate baseband input data streams, are coupled to the joint FEC coder 302. The joint FEC coder 302 encodes blocks of bits in the input data stream with one or more FEC codes to provide a FEC code encoded output. The FEC code encoded output of the joint FEC coder 302 is coupled to the symbol mapper 304. The symbol mapper 304 is configured to map blocks of bits in the FEC code encoded output to an associated modulation format, e.g. a quadrature amplitude modulation (QAM) symbol, and provide a serial high symbol rate signal.

The encoded and mapped symbols at the output of the symbol mapper 304 are coupled to the demultiplexer (DE-MUX) 306, which demultiplexes the serial high symbol rate signal at the output of the symbol mapper 304 into a plurality of parallel low symbol rate signals that are coupled to the subcarrier modulator 308. The subcarrier modulator 308 modulates each of the low symbol rate signals at the output of the demultiplexer 306 with an associated electrical subcarrier frequency to form respective subcarriers signals of the transmitter 300. The subcarrier signals at the output of the subcarrier modulator 308 are coupled to the multiplexer (MUX) 310, which combines the respective subcarriers into serial subcarrier aggregate signal. The subcarrier aggregate signal at the output of the multiplexer 310 is coupled to the optical modulator 312. The optical modulator 312 modulates the subcarrier aggregate signal onto an optical carrier wavelength $\lambda_N$ of the laser 314 to provide an SCM optical signal.

Figure 4:
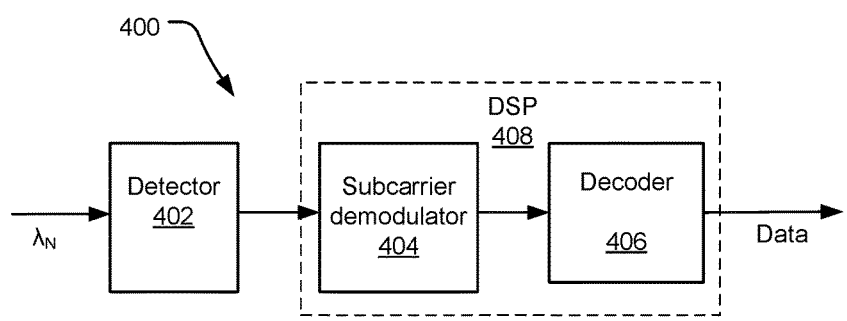
FIG. 4 is a block diagram of one exemplary embodiment of a receiver consistent with the present disclosure.

FIG. 4 is a simplified block diagram of one exemplary receiver 400 consistent with the present disclosure. The illustrated exemplary embodiment 400 includes a detector 402, a subcarrier demodulator 404 and a decoder 406. The detector 402 may include a known coherent receiver, e.g. a polarization diversity coherent receiver, and an analog-to-digital converter configured to receive the signal on the optical carrier wavelength $\lambda_N$ and convert the optical signal into one or more associated digital electrical outputs (e.g. an output associated with each polarization in a polarization multiplexed modulation format) representative of the symbols modulated on the optical carrier wavelength $\lambda_N$ by the modulator 312 (FIG. 3).

The subcarrier demodulator 404 and the decoder 406 may be configured as a portion of a digital signal processing (DSP) circuit 408. In general, DSP involves processing of signals using one or more application specific integrated circuits (ASICS) and/or special purpose processors configured for performing specific instruction sequences, e.g. directly and/or under the control of software instructions. One example of a receiver incorporating a detector, i.e. a coherent receiver, and a DSP circuit using carrier phase estimation for processing the digital outputs of the coherent receiver is described in U.S. Pat. No. 8,295,713, the teachings of which are hereby incorporated herein by reference.

With reference to both FIGS. 3 and 4, the DSP circuit 408 may process the output of the detector 402 and provide an output that reproduces data provided at the input to the transmitter 300. The subcarrier demodulator 404 is coupled the electrical output of the decoder 402 and reverses the subcarrier modulation applied by the subcarrier modulator 308. The decoder 406 is coupled to the output of the subcarrier demodulator 404. The decoder 406 reverses the mapping applied by the symbol mapper 304 and decodes the data using the FEC code(s) imparted by the transmitter 300. The output of the decoder 406 is a de-mapped and decoded output representative of the data stream provided at the input to the transmitter 300. Decoding by the decoder 406 may be performed, for example, using a maximum a posteriori (MAP) detector, and may be performed iteratively in response to a priori log likelihood ratio (LLR) feedback from the output of the receiver 400.

The specific arrangement of the transmitter 300 consistent with the present disclosure depends on the desired modulation format and FEC coding, and the arrangement of the receiver 400 depends on the arrangement of the transmitter 300. A variety of configurations for the transmitter 300 and/or receiver 400 are possible. Example embodiments shown and described herein are therefore presented by way of illustration and are not intended to be limiting.

Figure 5:
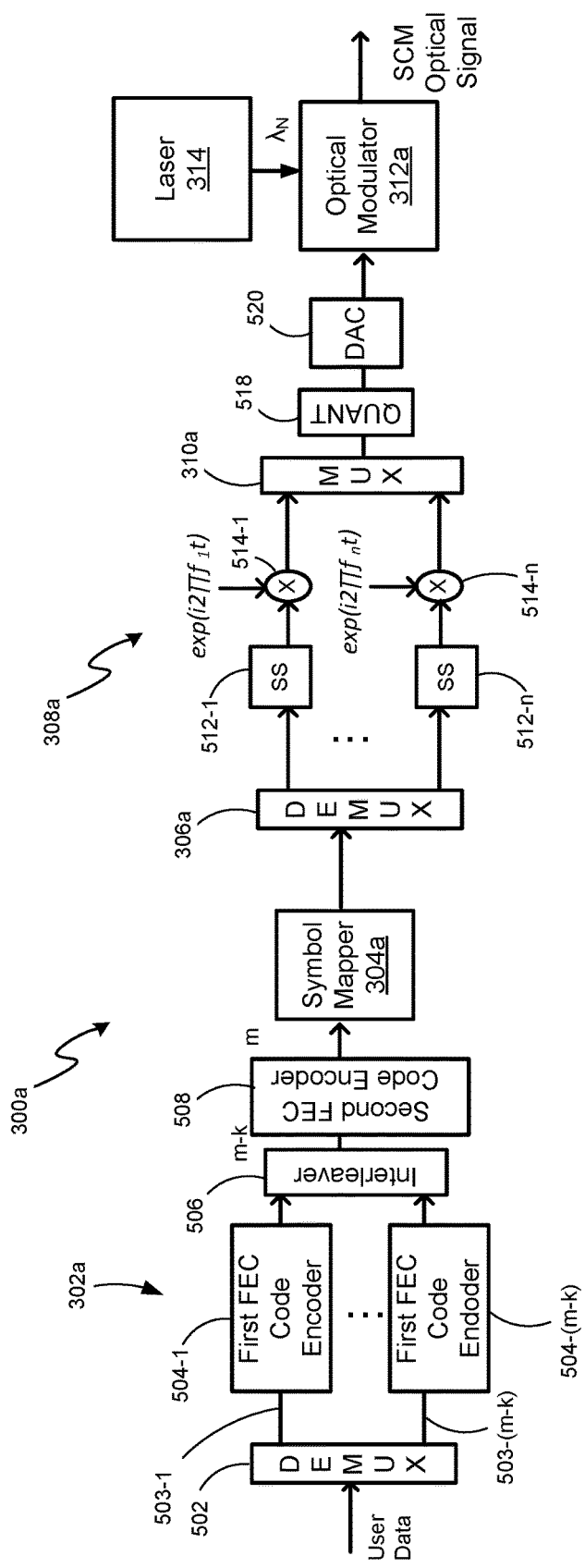
FIG. 5 is a block diagram of another exemplary embodiment of a transmitter consistent with the present disclosure.

FIG. 5, for example, illustrates an embodiment 300a of a transmitter consistent with the present disclosure. The illustrated exemplary embodiment 300a includes a joint FEC code encoder 302a, a symbol mapper 304a, a demultiplexer (DEMUX) 306a, a subcarrier modulator 308a, a multiplexer (MUX) 310a, a quantizer 518, a digital-to-analog converter (DAC) 520 and a modulator 312a for modulating the output of a continuous-wave laser 314 for providing a coded and modulated SCM optical signal output on a carrier wavelength $\lambda_N$.

The joint FEC code encoder 302a includes a demultiplexer (DEMUX) 502, a plurality of first FEC code encoders 504-1 ... 504-(m−k), an interleaver 506 and a second FEC encoder 508 and imparts joint FEC coding for all the subcarriers in the SCM optical signal output of the transmitter 300a using first and second FEC codes. The demultiplexer 502 may take a known configuration for receiving a serial input data stream and demultiplexing the input data stream into m−k separate parallel data streams, i.e. every (m−k)$^{th}$ bit is separated by the demultiplexer 502 onto the (m−k)$^{th}$ data path 503-1 ... 503-(m−k). Each of the m−k data streams are coupled to an associated one of the first FEC code encoders 504-1 ... 504-(m−k). The first FEC code encoders 504-1 ... 504-(m−k) may each be configured to encode the data stream received thereby with an associated first FEC code, e.g. a low density parity check (LDPC) code.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), single parity check (SPC) codes and low density parity check codes (LDPC). Hardware and software configurations for implementing various error correcting codes in the first FEC code encoders 504-1 ... 504-(m−k) are known to those of ordinary skill in the art.

The encoded output of each of the first FEC code encoders 504-1 . . . 504-($m-k$) is coupled to the interleaver 506. A variety of interleaver configurations are known. In the illustrated embodiment, the interleaver 506 receives m–k output codewords from the first FEC encoders 504-1 . . . 504-($m-k$) and interleaves the bits to provide m–k parallel data streams to the second FEC code encoder 508.

The second FEC code encoder 508 receives the m–k encoded and interleaved outputs of the interleaver 506 and encodes each m–k bits with a second FEC code having a coding overhead of k bits to provide the FEC code encoded output of the joint FEC code encoder 302a. The second FEC code may be any known FEC code, and in one embodiment may be a single parity check (SPC) code. A SPC code adds a single parity bit (k=1) to each m–k data bits. The parity bit indicates the parity (odd or even number of ones in the bit stream) of the m–k data bits associated therewith and provides m parallel outputs.

The m parallel outputs of the joint FEC code encoder 302a may be coupled to a known symbol mapper 304a. The symbol mapper 304a is configured to map blocks of bits to an associated modulation format symbol, e.g. a quadrature amplitude modulation (QAM) symbol, and provide a serial high symbol rate signal. In one embodiment, for example, the serial high symbol rate signal output of the symbol mapper 304a may have a symbol rate of 32 GBd.

The output of the symbol mapper 304a is coupled to the demultiplexer 306a. The demultiplexer 306a may take a known configuration for receiving a serial high symbol rate signal from the symbol mapper 304a and demultiplexing the input data stream into n separate parallel low symbol rate signal, each of which having a symbol rate of 1/n of the symbol rate of the serial high symbol rate output of the symbol mapper 304a. In one embodiment, for example, n=10 and the symbol rate of the parallel low symbol rate signals at the output of the demultiplexer 306a is $1/10^{th}$ of the symbol rate of the serial high symbol rate signal output of the symbol mapper 304a. In some embodiments, performance of a system and method consistent with the present disclosure may be optimized when the symbol rate of each of the parallel low symbol rate signals at the output of the demultiplexer 306a is between 3 GBd and 5 Gbd.

The outputs of the demultiplexer 306a are coupled to the subcarrier modulator 308a, which includes a plurality of spectral shaping (SS) filters 512-1 . . . 512-n and a plurality of mixers 514-1 . . . 514-n. As shown, each of then data streams at the output of the demultiplexer 306a are coupled to an associated one of the spectral shaping (SS) filters 512-1 . . . 512-n. The spectral shaping filters 512-1 . . . 512-n may take a known filter configuration, such as a raised cosine filter, to compensate for the frequency response of the electronic components in the transmitter 300a and generate a Nyquist spectrum.

The output of each of the spectral shaping filters 512-1 . . . 512-n is coupled to an associated one of the mixers 514-1 . . . 514-n. Each of the mixers is configured to frequency shift the output of its associated spectral shaping filter 512-1 . . . 512-n with an electrical subcarrier frequency to generate an associated subcarrier signal. The subcarrier signals at the output of the mixers 514-1 . . . 514-n are coupled to the multiplexer 310a, which combines the subcarrier signals to form a high data rate serial output to the quantizer 518. The quantizer 518 may take a known configuration for quantizing the input thereto and providing a serial output to the DAC 520, which converts the quantized input thereto to an analog output in a known manner. The output of the DAC 520 may be modulated onto an optical carrier wavelength $\lambda_N$ of a continuous-wave laser 514 using a known modulator 512a to provide an SCM optical signal output.

Figure 6:
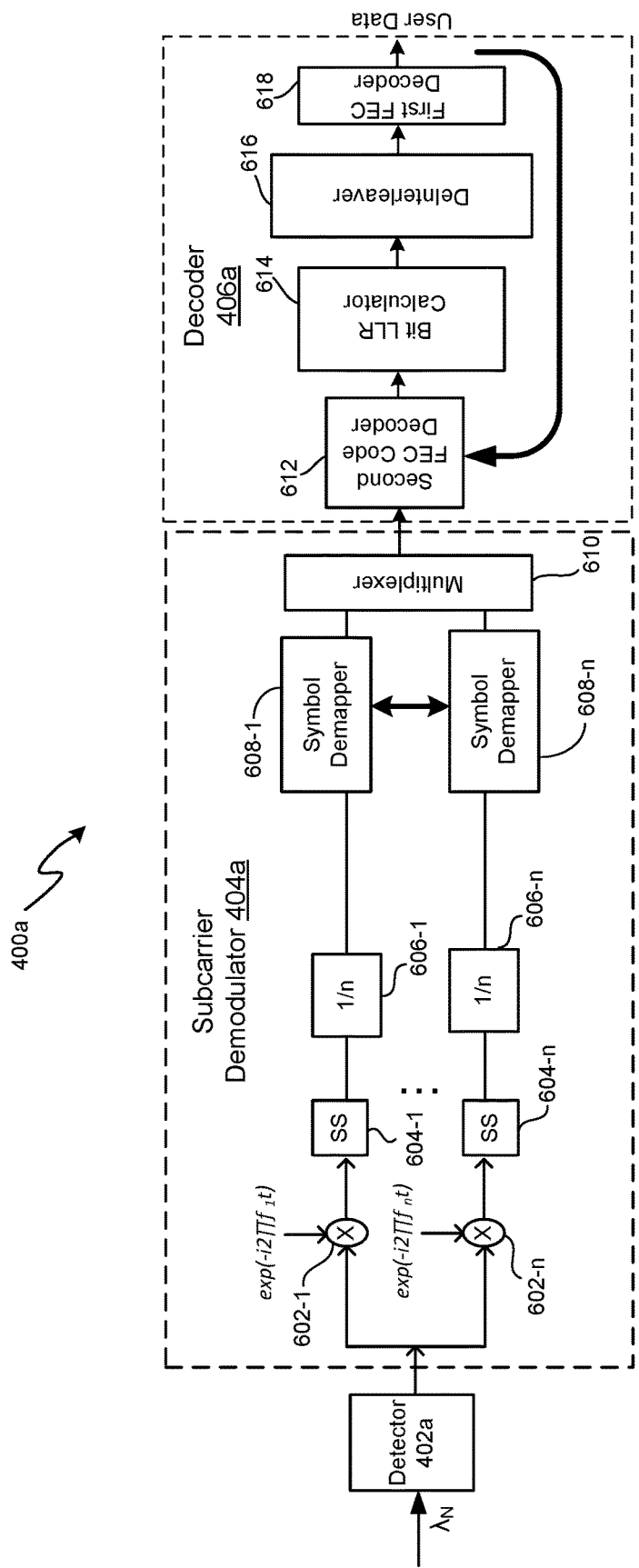
FIG. 6 is a block diagram of another exemplary embodiment of a receiver consistent with the present disclosure.

FIG. 6 is a simplified block diagram of one exemplary receiver 400a consistent with the present disclosure. The illustrated exemplary embodiment 400a includes a detector 402a, a subcarrier demodulator 404a and decoder 406a. The subcarrier demodulator 404a includes a plurality of mixers 602-1 . . . 602-n, a plurality of spectral shaping (SS) filters 604-1 . . . 604-n, a plurality of frequency down-converters 606-1 . . . 606-n, a plurality of symbol demappers 608-1 . . . 608-n and a multiplexer 610. The decoder 406a includes a second FEC decoder 612, a bit log-likelihood ratio (LLR) calculator 614, a deinterleaver 616 and a first FEC code decoder 618.

The detector 402a may be configured to receive the optical signal modulated on the carrier wavelength $\lambda_N$ and to convert the optical signal into a digital electrical signal. In one embodiment, for example, the detector 402 may include a known coherent receiver configuration, e.g. a polarization diversity coherent receiver, an analog-to-digital converter, local oscillator frequency compensation and I/Q delay compensation. The digital output of the detector is coupled to the subcarrier demodulator 404a.

The subcarrier demodulator 404a splits the output of the detector 402a into n parallel data streams. The parallel data streams are downshifted to baseband signals by the mixers 602-1 . . . 602-n, spectrum shaped by the spectral shaping (SS) filters 604-1 . . . 604-n, e.g. Nyquist filters, and down-sampled by the frequency down-converters 606-1 . . . 606-n. The outputs of the frequency down-converters 606-1 . . . 606-n are coupled to associated symbol demappers 608-1 . . . 608-n, which reverse the symbol mapping imparted by the symbol mapper 304a (FIG. 5). The outputs of the symbol demappers 608-1 . . . 608-n are multiplexed by multiplexer 610. The serial output of the multiplexer 610 is representative of the output of the second FEC code encoder 302a (FIG. 5).

The serial output of the multiplexer 610 is coupled to a second FEC code decoder 612, which decodes the input thereto using the second FEC code. The second FEC code decoder 612 may, for example, be configured as a known maximum a posteriori (MAP) decoder. The bit LLR calculator 614 is coupled to the decoded output of the second FEC code decoder 612 and makes bit decisions using log-likelihood ratios in a known manner. The output of the bit LLR calculator 614 is deinterleaved by the deinterleaver 616. The output of the deinterleaver 616 represents the input to the interleaver 506 and is coupled to the first FEC code decoder 618. The first FEC code decoder 618 decodes the input thereto using the first FEC code and provides an output representative of the input data provided to the transmitter. The output of the first FEC code decoder 618 may be provided as feedback to the second FEC code decoder 612 and decoding may be performed iteratively. Advantageously, in a system and method consistent with the present disclosure, all subcarriers may have substantially the same bit error rate (BER) after decoding due the joint FEC coding imparted at the transmitter.

Figure 7:
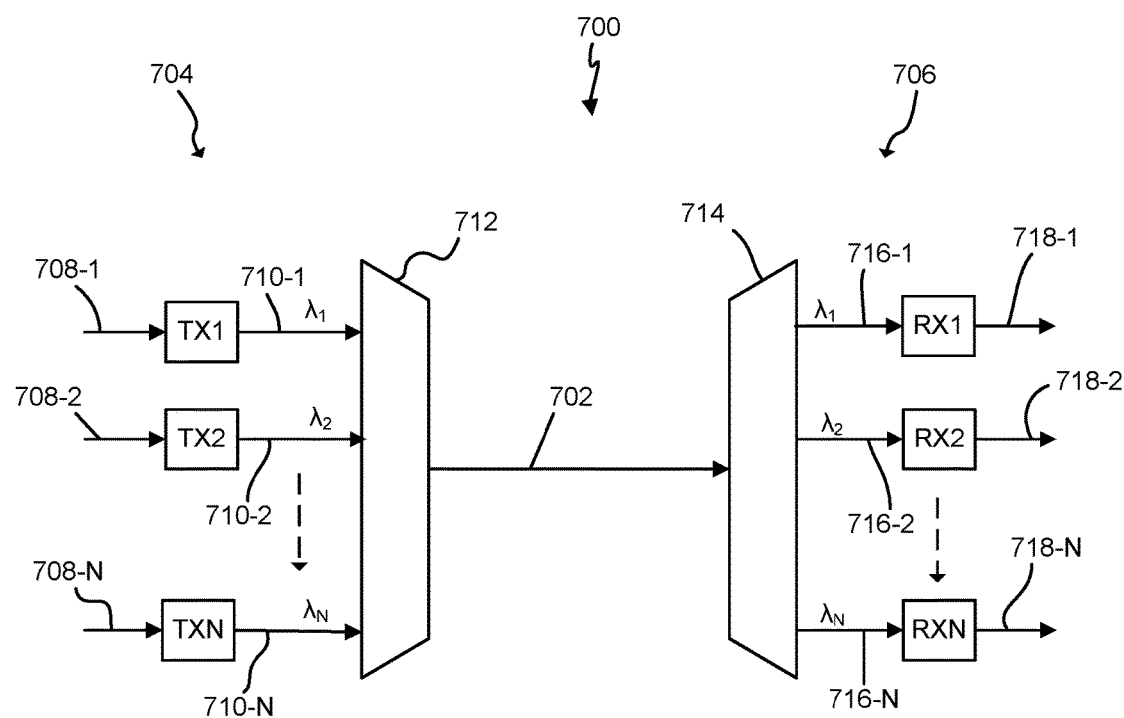
FIG. 7 is a block diagram of one exemplary embodiment of a wavelength division multiplex system consistent with the present disclosure.

A system and method consistent with the present disclosure may be implemented in a WDM configuration. FIG. 7 is a simplified block diagram of one exemplary embodiment of a WDM transmission system 700 consistent with the present disclosure. The transmission system serves to transmit a plurality of optical channels over an optical information path 702 from a transmitting terminal 704 to one or more remotely located receiving terminals 706. The exemplary system 700 may be a long-haul submarine system configured for transmitting the channels from a transmitter to a receiver at a distance of 5,000 km, or more.

The system 700 has been depicted as a highly simplified point-to-point system for ease of explanation. For example, the transmitting terminal 704 and receiving terminal 706 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 708-1, 708-2 . . . 708-N, and transmits the data signal on associated wavelength $\lambda_1$, $\lambda_2$ . . . $\lambda_N$. One or more of the transmitters may be configured as shown in FIG. 3 for providing an SCM optical signal output on an associated channel. The transmitted wavelengths or channels are respectively carried on a plurality of paths 710-1, 710-2 . . . 710-N. The data channels are combined into an aggregate signal on optical path 702 by a multiplexer or combiner 712. The optical information channel 702 may include optical fiber waveguides, optical amplifiers, optical filters, and other active and passive components. The optical information channel 702 may, or may not, include chromatic dispersion compensation modules.

The aggregate signal may be received at one or more remote receiving terminals 706. A demultiplexer 714 separates the transmitted channels at wavelengths $\lambda_1$, $\lambda_2$ . . . $\lambda_N$ onto associated paths 716-1, 716-2 . . . 716-N coupled to associated receivers RX1, RX2 . . . RXN. One or more of the receivers RX1, RX2 . . . RXN may be configured as shown in FIG. 4 to demodulate an associated transmitted SCM optical signal and provide an associated output data signal on an associated output path 718-1, 718-2, 718-3, 718-N.

Figure 8:
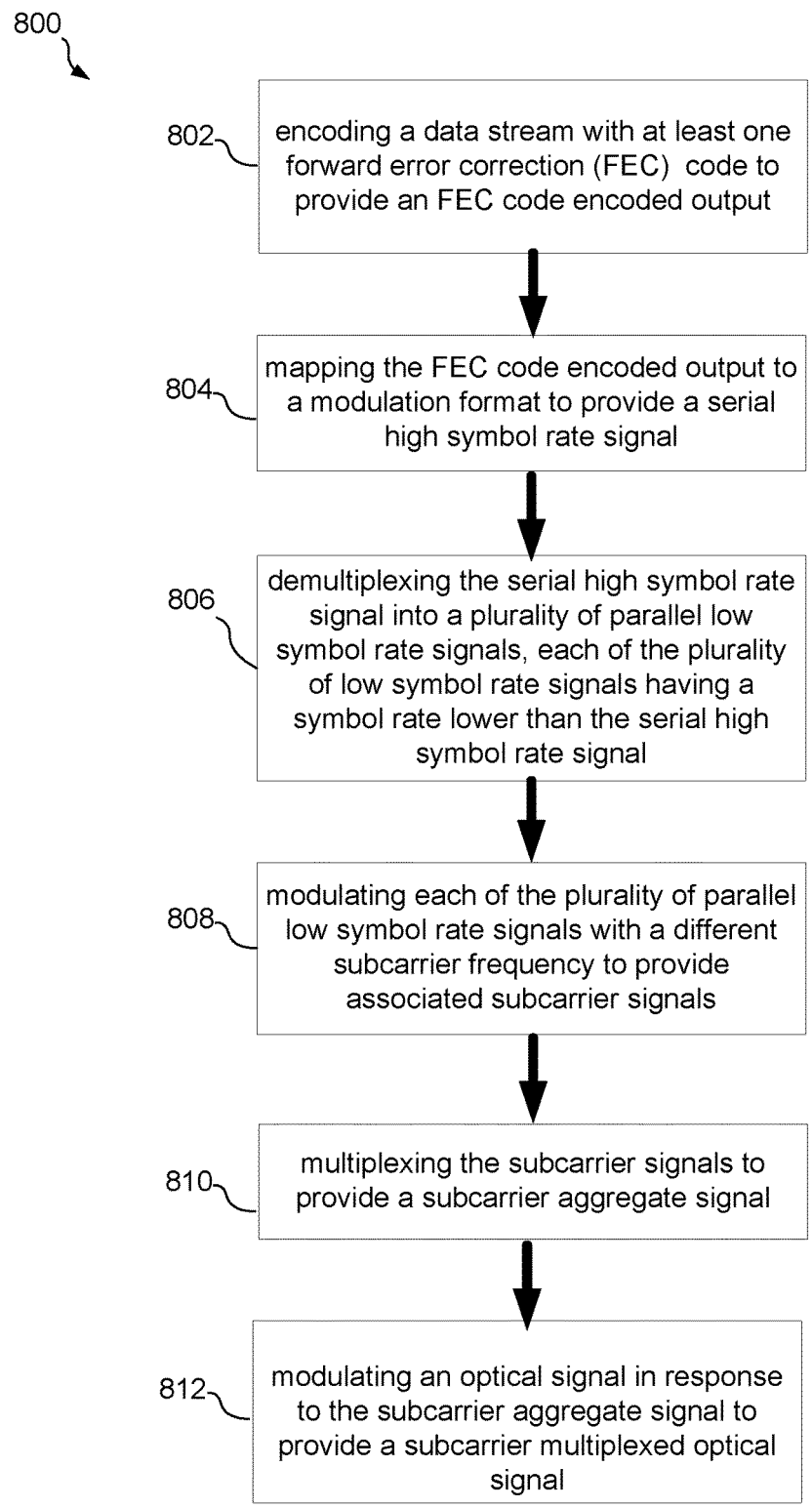
FIG. 8 is a block flow diagram illustrating an exemplary method consistent with the present disclosure.

FIG. 8 is a flow chart illustrating a method 800 consistent with the present disclosure. Operation 802 includes encoding a data stream with at least one forward error correction (FEC) code to provide an FEC code encoded output. In operation 804 the FEC code encoded output is mapped to a modulation format to provide a serial high symbol rate signal. The serial high symbol rate signal is demultiplexed 806 into a plurality of parallel low symbol rate signals, each of the plurality of low symbol rate signals having a symbol rate lower than the serial high symbol rate signal. In operation 808, each of the plurality of parallel low symbol rate signals is modulated with a different subcarrier frequency to provide associated subcarrier signals. The subcarrier signals are multiplexed to form a subcarrier aggregate signal 810, and an optical signal is modulated 812 in response to the subcarrier aggregate signal to provide a subcarrier multiplexed optical signal.

While FIG. 8 illustrates various operations according to an embodiment, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure, there is thus provided a system including: a joint forward error correction (FEC) code encoder to encode an associated input signal using at least one FEC code and provide an FEC code encoded output; a symbol mapper coupled to the joint FEC code encoder and configured to map the FEC code encoded output to a modulation format and provide a serial high symbol rate signal; a demultiplexer coupled to the symbol mapper and configured to separate the serial high symbol rate signal into a plurality of parallel low symbol rate signals, each of the plurality of low symbol rate signals having a symbol rate lower than the serial high symbol rate signal; a subcarrier modulator coupled to the demultiplexer and configured to modulate each of the plurality of parallel low symbol rate signals with a different subcarrier frequency to provide associated subcarrier signals; a multiplexer coupled to the subcarrier modulator and configured to multiplex the subcarrier signals to provide a subcarrier aggregate signal; and a modulator coupled to the multiplexer and configured to modulate an optical signal in response to the subcarrier aggregate signal to provide a subcarrier multiplexed optical signal.

According to another aspect of the disclosure, there is provided method including encoding a data stream with at least one forward error correction (FEC) code to provide an FEC code encoded output; mapping the FEC code encoded output to a modulation format to provide a serial high symbol rate signal; demultiplexing the serial high symbol rate signal into a plurality of parallel low symbol rate signals, each of the plurality of low symbol rate signals having a symbol rate lower than the serial high symbol rate signal; modulating each of the plurality of parallel low symbol rate signals with a different subcarrier frequency to provide associated subcarrier signals; multiplexing the subcarrier signals to provide a subcarrier aggregate signal; and modulating an optical signal in response to the subcarrier aggregate signal to provide a subcarrier multiplexed optical signal.

Embodiments of the methods described herein may be implemented using a processor and/or other programmable device, such as the DSP 408. To that end, the methods described herein may be implemented on a tangible, non-transitory computer readable medium having instructions stored thereon that when executed by one or more processors perform the methods. Thus, for example, the DSP 408 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the DSP 408 may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
    a joint forward error correction (FEC) code encoder to encode an associated input signal using at least one FEC code and provide an FEC code encoded output;
    a symbol mapper coupled to the joint FEC code encoder and configured to map the FEC code encoded output to a modulation format and provide a serial high symbol rate signal;
    a demultiplexer coupled to the symbol mapper and configured to separate the serial high symbol rate signal into a plurality of parallel low symbol rate signals, each of the plurality of low symbol rate signals having a symbol rate lower than the serial high symbol rate signal;
    a subcarrier modulator coupled to the demultiplexer and configured to modulate each of the plurality of parallel low symbol rate signals with a different subcarrier frequency to provide associated subcarrier signals;
    a multiplexer coupled to the subcarrier modulator and configured to multiplex the subcarrier signals to provide a subcarrier aggregate signal; and
    a modulator coupled to the multiplexer and configured to modulate an optical signal in response to the subcarrier aggregate signal to provide a subcarrier multiplexed optical signal.

2. A system according to claim 1, wherein the joint FEC code encoder comprises:
    a plurality of first FEC code encoders, each of the first FEC code encoders being configured to encode an input signal using a first FEC code and provide an associated first FEC code encoded output;
    an interleaver coupled to the plurality of first FEC code encoders and configured to provide an interleaved output comprising the associated first FEC code encoded outputs; and
    a second FEC code encoder coupled to the interleaver and configured to encode the interleaved output with a second FEC code to provide the FEC code encoded output.

3. A system according to claim 2, wherein the second FEC code comprises a single parity check (SPC) code.

4. A system according to claim 2, wherein the first FEC code comprises a low density parity check code (LDPC).

5. A system according to claim 2, wherein the first FEC code comprises a low density parity check (LDPC) code and the second FEC code comprises a single parity check (SPC) code.

6. A system according to claim 1, wherein the subcarrier multiplexed optical signal has a quadrature amplitude modulation (QAM) format.

7. A system according to claim 1, the system further comprising:
    a subcarrier demodulator configured to receive a signal representative of subcarrier multiplexed optical signal and provide a demodulated serial output at the high symbol rate; and
    a decoder coupled to the subcarrier demodulator and configured to decode the demodulated serial output using the at least one FEC code to provide a decoded output signal representative of the associated input signal.

8. A method comprising:
    encoding a data stream with at least one forward error correction (FEC) code to provide an FEC code encoded output;
    mapping the FEC code encoded output to a modulation format to provide a serial high symbol rate signal;
    demultiplexing the serial high symbol rate signal into a plurality of parallel low symbol rate signals, each of the plurality of low symbol rate signals having a symbol rate lower than the serial high symbol rate signal;
    modulating each of the plurality of parallel low symbol rate signals with a different subcarrier frequency to provide associated subcarrier signals;
    multiplexing the subcarrier signals to provide a subcarrier aggregate signal; and
    modulating an optical signal in response to the subcarrier aggregate signal to provide a subcarrier multiplexed optical signal.

9. A method according to claim 8, wherein the encoding a data stream with at least FEC code comprises:
    demultiplexing the data stream into a plurality of data streams;
    encoding each of the plurality of data streams using a first FEC code to provide a plurality of first FEC code encoded data streams;
    interleaving the first FEC code encoded data streams to provide at least one interleaved output; and encoding the interleaved output using a second FEC code to provide the FEC code encoded data stream.

10. A method according to claim 9, wherein the second FEC code comprises a single parity check (SPC) code.

11. A method according to claim 9, wherein the first FEC code comprises a low density parity check code (LDPC).

12. A method according to claim 9, wherein the first FEC code comprises a low density parity check (LDPC) code and the second FEC code comprises a single parity check (SPC) code.

13. A method according to claim 8, wherein the subcarrier multiplexed optical signal has a quadrature amplitude modulation (QAM) format.

14. A method according to claim 8, the method further comprising:
  demodulating a signal representative of the subcarrier multiplexed optical signal provide a demodulated serial output at the high symbol rate; and
  decoding the demodulated serial output using the at least one FEC code to provide a decoded output signal representative of the associated input signal.

* * * * *